United States Patent
Cho et al.

(10) Patent No.: US 11,728,095 B2
(45) Date of Patent: Aug. 15, 2023

(54) ELECTRONIC COMPONENT

(71) Applicant: SAMSUNG ELECTRO-MECHANICS CO., LTD., Suwon-si (KR)

(72) Inventors: Beom Joon Cho, Suwon-si (KR); Seung Min Ahn, Suwon-si (KR); Mi Na Hyun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/460,887

(22) Filed: Aug. 30, 2021

(65) Prior Publication Data

US 2022/0181086 A1 Jun. 9, 2022

(30) Foreign Application Priority Data

Dec. 4, 2020 (KR) .................. 10-2020-0168786

(51) Int. Cl.
| | |
|---|---|
| *H01G 4/30* | (2006.01) |
| *H01G 2/06* | (2006.01) |
| *H01G 4/232* | (2006.01) |
| *H01G 4/12* | (2006.01) |
| *H01G 4/008* | (2006.01) |
| *H01G 4/012* | (2006.01) |

(52) U.S. Cl.
CPC ........... *H01G 4/2325* (2013.01); *H01G 2/065* (2013.01); *H01G 4/008* (2013.01); *H01G 4/012* (2013.01); *H01G 4/12* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 10,056,193 B1 * | 8/2018 | Son .................... | H01G 4/232 |
| 10,395,843 B2 * | 8/2019 | Koini .................. | H01G 4/30 |
| 10,943,740 B2 * | 3/2021 | Koini .................. | H05K 1/181 |
| 11,342,126 B2 * | 5/2022 | Koini .................. | H01G 4/248 |
| 2005/0041367 A1 * | 2/2005 | Yoshii ................ | H01G 4/228 |
| | | | 361/303 |
| 2012/0236462 A1 * | 9/2012 | Haruki ............... | H01G 4/005 |
| | | | 361/306.1 |

(Continued)

FOREIGN PATENT DOCUMENTS

| | | |
|---|---|---|
| JP | 2004-273935 A | 9/2004 |
| JP | 5664574 B2 | 12/2014 |
| KR | 10-2017-0118900 A | 10/2017 |

OTHER PUBLICATIONS

Uknown, http://blog.naver.com/lastfrog/40025340989.

*Primary Examiner* — Dion R. Ferguson
(74) *Attorney, Agent, or Firm* — Morgan, Lewis & Bockius LLP

(57) ABSTRACT

An electronic component, which is mounted on a substrate having an electrode pad disposed on an upper surface thereof and bonded to a metal frame of the electronic component through a solder, includes a capacitor body, an external electrode respectively disposed on one end of the capacitor body, and a metal frame connected to the external electrode and mounted on the electrode pad of the substrate. The metal frame is divided into first and second portions including different metals having different electrical conductivity.

20 Claims, 6 Drawing Sheets

(56) References Cited

U.S. PATENT DOCUMENTS

| | | | |
|---|---|---|---|
| 2016/0343506 A1* | 11/2016 | Lee | H01G 2/065 |
| 2017/0127520 A1* | 5/2017 | Park | H01G 4/12 |
| 2017/0164479 A1* | 6/2017 | Park | H01G 4/30 |
| 2018/0247768 A1* | 8/2018 | Koini | H05K 1/181 |
| 2019/0124771 A1* | 4/2019 | Park | H05K 3/301 |
| 2020/0118752 A1* | 4/2020 | Cho | H01G 4/12 |
| 2021/0065987 A1* | 3/2021 | Na | H01G 4/30 |
| 2022/0181086 A1* | 6/2022 | Cho | H01G 4/232 |

* cited by examiner

ELECTRONIC COMPONENT

CROSS-REFERENCE TO RELATED APPLICATION(S)

This application claims the benefit of priority to Korean Patent Application No. 10-2020-0168786, filed on Dec. 4, 2020 in the Korean Intellectual Property Office, the entire disclosure of which is incorporated herein by reference for all purposes.

TECHNICAL FIELD

The present disclosure relates to an electronic component.

BACKGROUND

Multilayer capacitors are used in various electronic devices due to miniaturization while implementing high capacitance.

In recent years, as eco-friendly vehicles and electric vehicles have rapidly emerged, the importance of power driving systems inside vehicles is increasing, and thus, demand for multilayer capacitors required for power driving systems is also increasing.

To use a multilayer capacitor as a component of an automobile, a high level of thermal reliability, electrical reliability, and mechanical reliability are required.

In detail, as the mounting density of components inside the vehicle increases, there is a need for a multilayer capacitor which may be easy to install in a limited space and is able to implement a high capacitance and which has excellent durability against vibrations and deformation.

In addition, as a method for improving the durability of the multilayer capacitor against vibrations and deformation, there is a method of mounting the multilayer capacitor to be spaced apart from a substrate using a metal frame.

However, in the case of an electronic component using such a metal frame, equivalent series resistance (ESR) increases, since the path through which an electrical signal is transmitted from a component to the substrate increases, and the resulting self-heating may cause deterioration of the circuit as well as the electronic component.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Exemplary embodiments provide an electronic component in which durability of a multilayer capacitor against vibrations and deformation may be improved by applying a metal frame structure and an increase in equivalent series resistance due to the metal frame may be significantly reduced.

According to an exemplary embodiment, an electronic component, which is mounted on a substrate having an electrode pad is disposed on an upper surface thereof and bonded to a metal frame of the electronic component through a solder, includes a capacitor body, an external electrode respectively disposed on one end of the capacitor body, and a metal frame connected to the external electrode and mounted on the electrode pad of the substrate. The metal frame is divided into first and second portions including different metals having different electrical conductivity.

The first portion may include at least one of Ni, Fe or Sn, and the second portion may include at least one of Cu, Al, Ag or Au.

The first portion may be in contact with the solder, and the second portion may not be in contact with the solder.

The electrical conductivity of the first portion may be less than of equal to electrical conductivity of the solder.

The capacitor body may include a dielectric layer and a plurality of internal electrodes alternately disposed with the dielectric layer interposed therebetween.

The external electrode may include a head portion disposed on one surface of the capacitor body, and a band portion extending from the head portion onto portions of upper and lower surfaces and both side surfaces of the capacitor body that are connected to the one surface of the capacitor body.

The metal frame may include a connection portion connected to the head portion, and a mounting portion bent from a lower end of the connection portion and extending to be connected to the electrode pad.

A conductive bonding layer may be disposed between the head portion of the external electrode and the connection portion of the metal frame.

The mounting portion may extend in a direction from the lower end of the connection portion toward a mounting portion of another metal frame located opposite thereto.

The mounting portion and the band portion of the external electrode may be spaced apart from each other.

A length of a vertical portion of the metal frame, not in contact with the solder, may be greater than a length of the head portion of the external electrode, with respect to a direction in which the electronic component is mounted on the substrate.

According to another exemplary embodiment, an electronic component, which is mounted on a substrate having an electrode pad is disposed on an upper surface thereof and bonded to a metal frame of the electronic component through a solder, includes a capacitor body; an external electrode respectively disposed on one end of the capacitor body; and a metal frame connected to the external electrode and mounted on the electrode pad of the substrate. The metal frame comprises a first portion, which is in contact with the solder, and a second portion, which is not in contact with the solder, and electrical conductivity of the second portion is higher than electrical conductivity of the solder.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
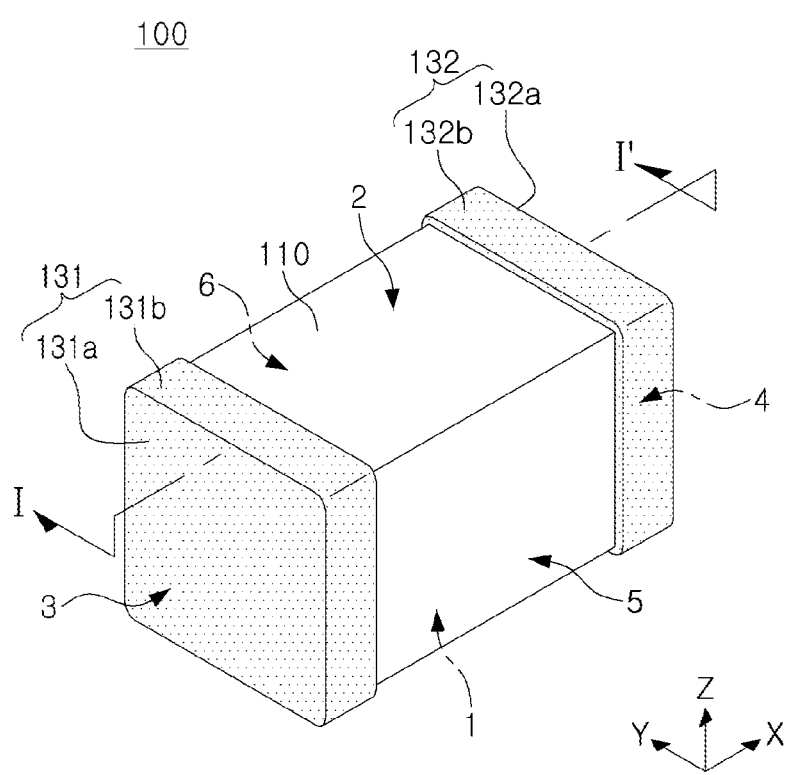
FIG. 1 is a schematic perspective view of a multilayer capacitor applied to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

When directions are defined to clearly describe an exemplary embodiment, X, Y, and Z indicated in the drawings represent the length direction, the width direction, and the thickness direction of the multilayer capacitor and electronic component, respectively.

The Z direction may be used in the same concept as the stacking direction in which the dielectric layers are stacked in the embodiment.

Figure 2A:
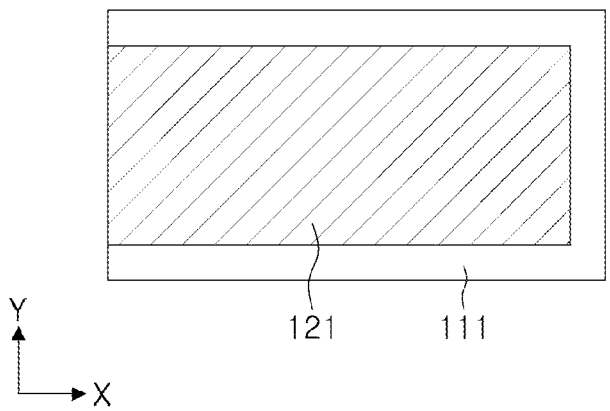
FIGS. 2A and 2B are plan views illustrating first and second internal electrodes applied to FIG. 1, respectively.
Figure 2B:
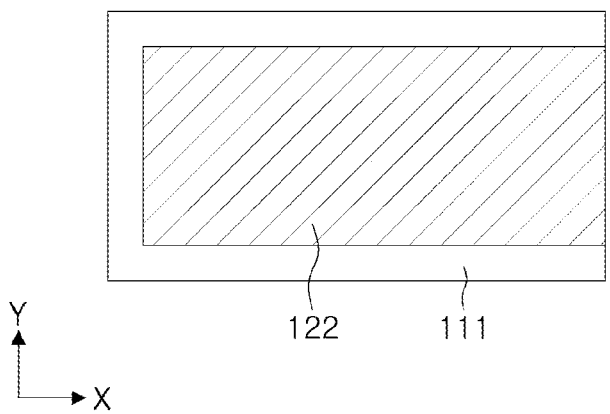
Figure 3:
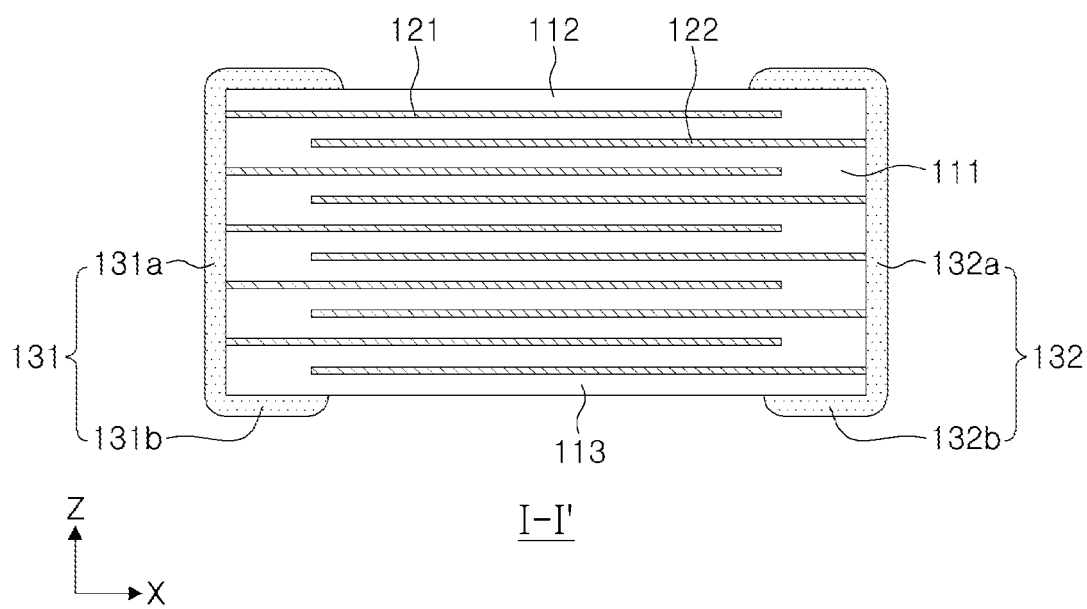
FIG. 3 is a cross-sectional view taken along line I-I' of FIG. 1.

FIG. 1 is a perspective view schematically illustrating a multilayer capacitor applied to an embodiment, FIGS. 2A and 2B are plan views illustrating first and second internal electrodes applied to FIG. 1, respectively, and FIG. 3 is a cross-sectional view taken along line I-I' of FIG. 1.

The structure of a multilayer capacitor 100 applied to an electronic component according to an embodiment will be described with reference to FIGS. 1 to 3.

The multilayer capacitor 100 according to an embodiment includes a capacitor body 110, and first and second external electrodes 131 and 132 disposed on both ends of the capacitor body 110 in the X direction, respectively.

The capacitor body 110 is obtained by stacking a plurality of dielectric layers 111 in the Z direction to then be sintered.

The boundaries between adjacent dielectric layers 111 of the capacitor body 110 may be integrated to the extent that it is difficult to check without using a scanning electron microscope (SEM).

The capacitor body 110 includes the plurality of dielectric layers 111, and first and second internal electrodes 121 and 122 alternately disposed in the Z direction with the dielectric layers 111 interposed therebetween. In this case, the first and second internal electrodes 121 and 122 have different polarities.

The capacitor body 110 may include an active region and cover regions 112 and 113.

The active region is a portion that contributes to the formation of capacitance of the multilayer capacitor.

The cover regions 112 and 113 may be provided on upper and lower portions of the active region in the Z direction as margin portions, respectively.

The cover regions 112 and 113 may be formed by stacking a single dielectric layer 111 or two or more dielectric layers 111 on the upper and lower surfaces of the active region, respectively.

Also, the cover regions 112 and 113 may prevent damage to the first and second internal electrodes 121 and 122 due to physical or chemical stress.

The capacitor body 110 is not particularly limited in the shape thereof, but may have a substantially hexahedral shape.

In this embodiment, the capacitor body 110 may include first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2, connected to the third and fourth surfaces 3 and 4, and opposing each other. In this case, the first surface 1 may be a mounting surface.

Further, the shape and dimensions of the capacitor body 110 and the number of stacked dielectric layers 111 are not limited to those illustrated in the drawings of this embodiment.

The dielectric layer 111 may include ceramic powder, for example, $BaTiO_3$-based ceramic powder.

The $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr or the like is partially dissolved in $BaTiO_3$, and the ceramic powder according to an embodiment is not limited thereto.

In addition, a ceramic additive, an organic solvent, plasticizer, a binder, and a dispersant may be further added to the dielectric layer 111.

The ceramic additive may include a transition metal oxide or a transition metal carbide, a rare earth element, magnesium (Mg) or aluminum (Al).

The first and second internal electrodes 121 and 122 are electrodes to which different polarities are applied.

The first and second internal electrodes 121 and 122 may be formed on the dielectric layer 111 respectively, and may be stacked in the Z direction.

The first and second internal electrodes 121 and 122 may be alternately disposed inside of the capacitor body 110 to face each other in the Z direction with one dielectric layer 111 interposed therebetween.

In this case, the first and second internal electrodes 121 and 122 may be electrically insulated from each other by the dielectric layer 111 disposed therebetween.

On the other hand, in this embodiment, a plurality of internal electrodes are illustrated and described as being stacked in the Z direction, but the present disclosure is not limited thereto, and a structure in which internal electrodes are stacked in the Y direction may be applied to an embodiment of the present disclosure as necessary.

One end of the first internal electrode 121 may be exposed through the third surface 3 of the capacitor body 110.

In this manner, the end of the first internal electrode 121 exposed through the third surface 3 of the capacitor body 110 may be electrically connected to the first external electrode 131 disposed on one end of the capacitor body 110 in the X direction.

One end of the second internal electrode 121 may be exposed through the fourth surface 4 of the capacitor body 110.

In this manner, the end of the second internal electrode 122 exposed through the fourth surface 4 of the capacitor body 110 may be electrically connected to the second external electrode 132 disposed on one end of the capacitor body 110 in the X direction.

According to the above configuration, when a predetermined voltage is applied to the first and second external electrodes 131 and 132, electric charges are accumulated between the first and second internal electrodes 121 and 122.

In this case, the capacitance of the multilayer capacitor 100 is proportional to the area of overlap of the first and second internal electrodes 121 and 122 overlapping each other in the Z direction in the active region.

The material for the formation of the first and second internal electrodes 121 and 122 is not particularly limited.

For example, the first and second internal electrodes 121 and 122 may be formed using a conductive paste formed of at least one of a noble metal material, nickel (Ni) and copper (Cu).

The noble metal material may be platinum (Pt), palladium (Pd), a palladium-silver (Pd—Ag) alloy or the like.

The conductive paste may be printed using a screen-printing method or a gravure printing method, and the present disclosure is not limited thereto.

The first and second external electrodes 131 and 132 are provided with voltages of different polarities, are disposed on both ends of the capacitor body 110 in the X direction, respectively, and contact and are electrically connected to exposed ends of the first and second internal electrodes 121 and 122, respectively.

The first external electrode 131 may include a first head portion 131a and a first band portion 131b.

The first head portion 131a is disposed on the third surface 3 of the capacitor body 110.

The first head portion 131a is in contact with an end of the first internal electrode 121, exposed externally through the third surface 3 of the capacitor body 110, to electrically connect the first internal electrode 121 and the first external electrode 131.

The first band portion 131b is a portion extending from the first head portion 131a to portions of the first, second, fifth and sixth surfaces 1, 2, 5 and 6 of the capacitor body 110.

The first band portion 131b may serve to improve adhesion strength of the first external electrode 131, or the like.

The second external electrode 132 may include a second head portion 132a and a second band portion 132b.

The second head portion 132a is disposed on the fourth surface 4 of the capacitor body 110.

The second head portion 132a is in contact with an end of the second internal electrode 122, exposed externally through the fourth surface 4 of the capacitor body 110, to electrically connect the second internal electrode 122 and the second external electrode 132.

The second band portion 132b is a portion extending from the second head portion 132a to portions of the first, second, fifth and sixth surfaces 1, 2, 5 and 6 of the capacitor body 110.

The second band portion 132b may serve to improve adhesion strength of the second external electrode 132.

On the other hand, the first and second external electrodes 131 and 132 may further include a plating layer.

The plating layer may include first and second nickel (Ni) plating layers disposed on the capacitor body 110, and first and second tin (Sn) plating layers covering the first and second nickel plating layers, respectively.

Figure 4:
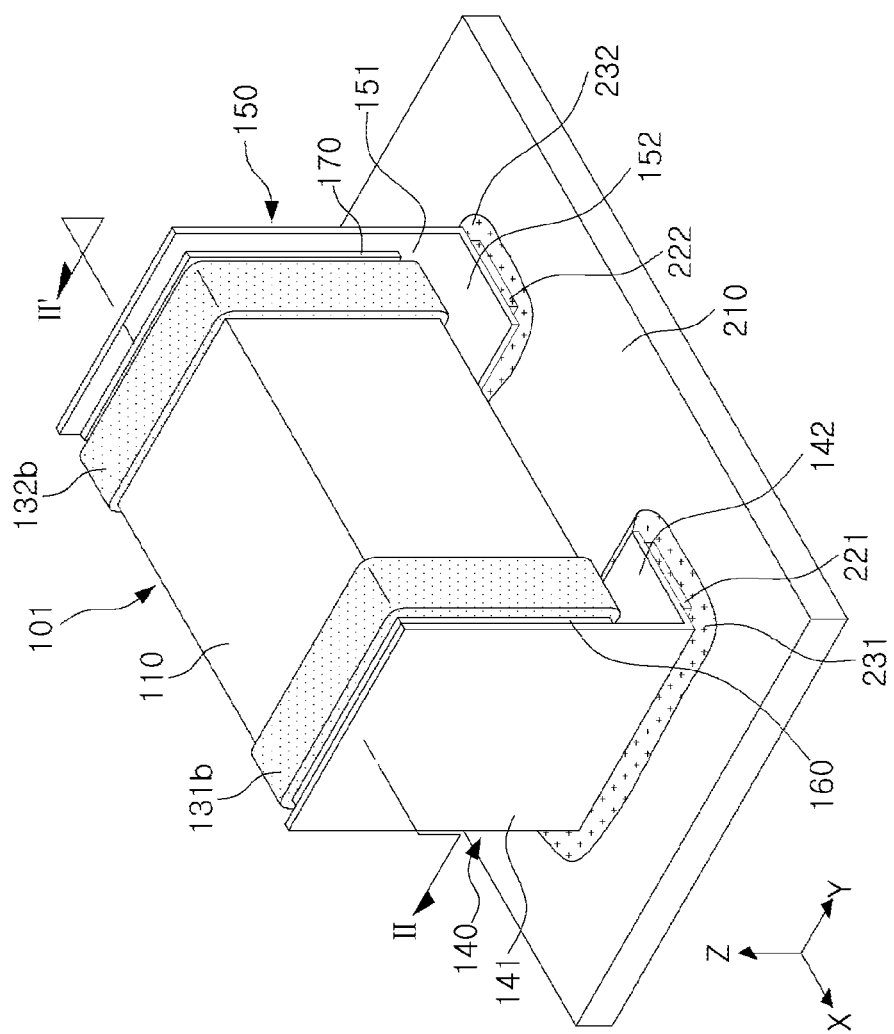
FIG. 4 is a perspective view schematically illustrating a coupling structure between an electronic component and a substrate according to an embodiment.
Figure 5:
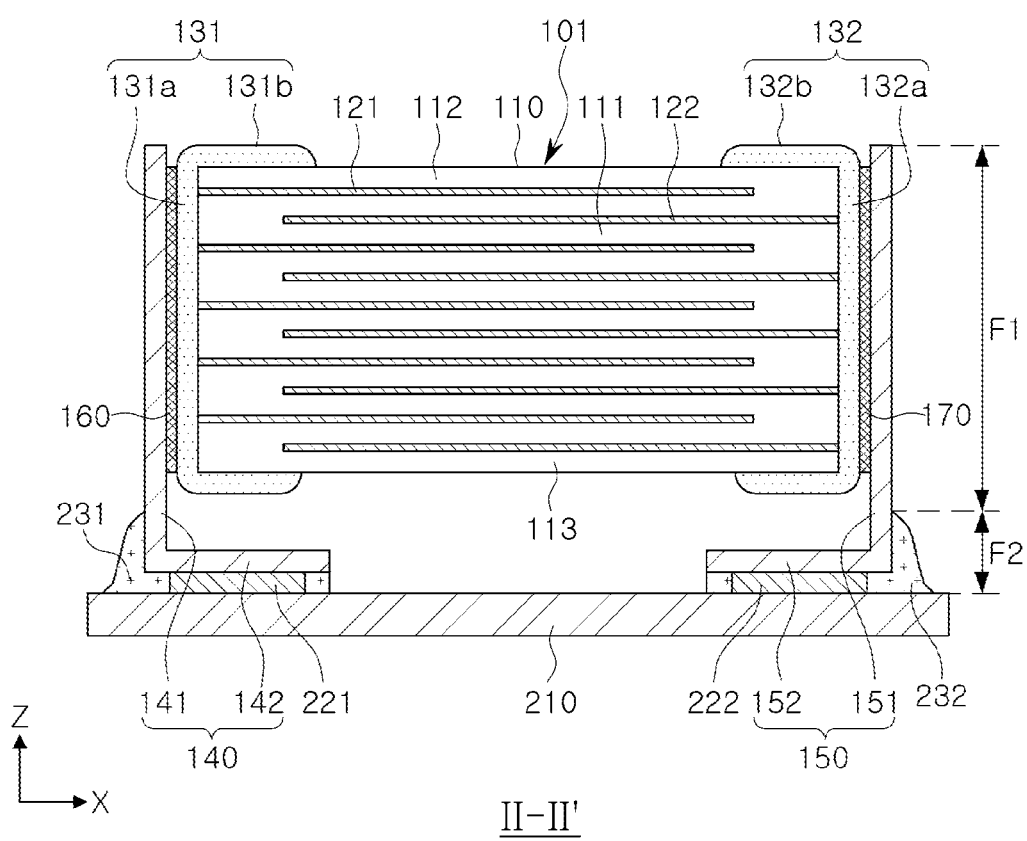
FIG. 5 is a cross-sectional view taken along line II-II' of FIG. 4.

FIG. 4 is a perspective view schematically illustrating a coupling structure between an electronic component and a substrate according to an exemplary embodiment, and FIG. 5 is a cross-sectional view taken along line II-II' of FIG. 4.

Referring to FIGS. 4 and 5, an electronic component according to an embodiment includes a multilayer capacitor 100 that includes a capacitor body 110 and first and second external electrodes 131 and 132, and first and second metal frames 140 and 150 connected to the first and second external electrodes 131 and 132, respectively.

The first metal frame 140 may include a first connection portion 141 and a first mounting portion 142.

The first connection portion 141 is a portion that is bonded to the first head portion 131a of the first external electrode 131, to be physically connected thereto. The first connection portion 141 is connected to the first head portion 131a of the first external electrode 131.

In this case, a first conductive bonding layer 160 may be disposed between the first head portion 131a of the first external electrode 131 and the first connection portion 141.

The first conductive bonding layer 160 may be formed of high-temperature solder or a conductive bonding material, and the present disclosure is not limited thereto.

The first mounting portion 142 may be bent and extended toward a second mounting portion 152 of the second metal frame 150 located on the side opposite thereto in the X direction, from a lower end of the first connection portion 141, and may be a portion formed horizontally with the mounting surface.

The first mounting portion 142 serves as a connection terminal when an electronic component 101 is mounted on a substrate 210.

In this case, the first mounting portion 142 may be disposed to be spaced apart from the first surface 1 of the capacitor body 110 and the first band portion 131b of the multilayer capacitor 100.

The second metal frame 150 may include a second connection portion 151 and a second mounting portion 152.

The second connection portion 151 is a portion that is bonded to the second head portion 132a of the second external electrode 132 to be physically connected thereto, and is connected to the second head portion 132a of the second external electrode 132.

In this case, a second conductive bonding layer 170 may be disposed between the second head portion 132a of the second external electrode 132 and the second connection portion 151.

The second conductive bonding layer 170 may be formed of high-temperature solder or a conductive bonding material, and the present disclosure is not limited thereto.

The second mounting portion 152 may be bent and extended toward the first mounting portion 142 of the first metal frame 140 located on the side opposite thereto in the X direction, from a lower end of the second connection portion 151, and may be a portion formed horizontally with the mounting surface.

The second mounting portion 152 serves as a connection terminal when the electronic component 101 is mounted on the substrate 210.

In this case, the second mounting portion 152 may be disposed to be spaced apart from the first surface 1 of the capacitor body 110 and the second band portion 132b of the multilayer capacitor 100.

Further, the electronic component of this embodiment includes the substrate 210 on which first and second electrode pads 221 and 222 are disposed to be spaced apart from each other in the X direction on the upper surface thereof.

In this case, the electronic component 101 is mounted on the substrate 210, in such a manner that the first and second mounting portions of the first and second metal frames 140 and 150, to be described later, are located to be in contact with the first and second electrode pads 221 and 222, respectively.

The first mounting portion 142 of the first metal frame 140 and the first electrode pad 221 are bonded to each other by a solder 231, and the second mounting portion 152 of the second metal frame 150 and the second electrode pad 222 are bonded to each other by a solder 232.

In this embodiment, the first metal frame 140 is divided into first and second portions F2 and F1 formed of different metals having different electrical conductivity depending on the location.

In this case, the first portion F2 is a portion in contact with the solder 231, and may correspond to the first mounting portion 142 and a lower portion of the first connection portion 141. The second portion F1 is a portion not in contact with the solder 231, and may correspond to an upper portion of the first connection portion 141 (a portion excepting the first portion).

As such, the first metal frame 140 may have two different electrical conductivity, and the electrical conductivity of the portion F1 not in contact with the solder 231 may be greater than the electrical conductivity of the solder 231.

In this case, in the first metal frame 140, the first portion F2, a portion in contact with the solder 231, may include at least one of materials such as Ni, Fe, and Sn, and the second portion F1 not in contact with the solder 231 may include at least one of materials such as Cu, Al, Ag and Au.

The second metal frame 150 is divided into first and second portions F2 and F1 formed of different metals having different electrical conductivity depending on the location.

In this case, the first portion F2 is a portion in contact with the solder 232, and may correspond to the second mounting portion 152 and a lower portion of the second connection portion 151. The second portion F1 is a portion not in contact with the solder 232, and may correspond to an upper portion (a portion excepting the first portion) of the second connection portion 151.

As such, the second metal frame 150 may have two different electrical conductivity, and the electrical conductivity of the portion F1 not in contact with the solder 232 may be greater than the electrical conductivity of the solder 232.

In this case, in the second metal frame 150, the first portion F2, a portion in contact with the solder 232, may include at least one of materials such as Ni, Fe, and Sn, and the second portion F1, a portion not in contact with the solder 232, may include at least one of materials such as Cu, Al, Ag, and Au.

In the first and second connection portions 141 and 151 of the first and second metal frames 140 and 150, lengths of the portions in the Z direction, not in contact with the solders 231 and 232, may be greater than lengths of the first and second head portions 131a and 132a of the external electrodes 131 and 132 in the Z direction, respectively.

A related art multilayer capacitor has a structure in which an external electrode of the multilayer capacitor and a substrate directly contact each other by solder when mounted on the substrate.

In this case, accordingly, since heat or mechanical strain generated from the substrate is directly transferred to the multilayer capacitor, it may be difficult to secure a high level of reliability for the multilayer capacitor.

In the case of the electronic component 101 according to this embodiment of the present disclosure, a gap between the multilayer capacitor 100 and the substrate 210 may be secured by bonding the first and second metal frames 140 and 150 to both ends of the multilayer capacitor 100, respectively.

Accordingly, when the electronic component 101 is mounted on the substrate 210, stress from the substrate 210 is not directly transferred to the multilayer capacitor 100, thereby improving thermal reliability, electrical reliability, and mechanical reliability of the electronic component 101.

However, in the case of an electronic component using a metal frame, since the multilayer capacitor is relatively away from the substrate, the path through which the electric signal is transmitted to the substrate increases, and thus, the equivalent series resistance (ESR) may increase.

Accordingly, the electronic component and circuits may be deteriorated due to self-heating. In this case, as the electrical conductivity of the metal frame increases, an increase in ESR of the electronic component decreases.

In a general multilayer capacitor to which a metal frame is not bonded, an external electrode including a plating layer is connected to an electrode pad of a substrate by solder.

Meanwhile, in an electronic component including a metal frame, a metal frame is added between an external electrode of a multilayer capacitor and a solder for mounting on a substrate, and the electrical conductivity of the metal frame of this embodiment is higher than that of the solder.

In detail, in this embodiment, the electrical conductivity of the portion of the metal frame, which is not in contact with the solder, has a value greater than the electrical conductivity of the solder, thereby suppressing an increase in equivalent series resistance due to the metal frame.

To ensure that only a portion of the metal frame has different electrical conductivity, for example, a method in which frames of different materials are vertically connected, different-metal frames are bonded side by side only in a partial area, or plating of a material having relatively high conductivity is applied to only a partial area may be used.

As described above, in this embodiment, a plating layer may be formed using a metal of a material having high conductivity, in portions corresponding to F1 in the first and second metal frames 140 and 150.

On the other hand, in FIG. 5, in the height at which the solder fillet is formed from the surface of the substrate in the Z direction, which is the vertical direction toward the metal frame, since electric conduction through solder occurs, an influence of the increase in electrical conductivity of the metal frame on reduction in ESR of an electronic component is not significant.

For example, in the region F2 of the metal frame to which the solder is bonded, in the case in which the electrical conductivity of the metal frame is equal to or even lower than that of the solder, the deterioration of the characteristics is insignificant. Therefore, in this embodiment, the metal frame may be provided such that the electrical conductivity of the metal frame is higher than that of the solder only in the region F1 not in contact with the solder.

Figure 6:
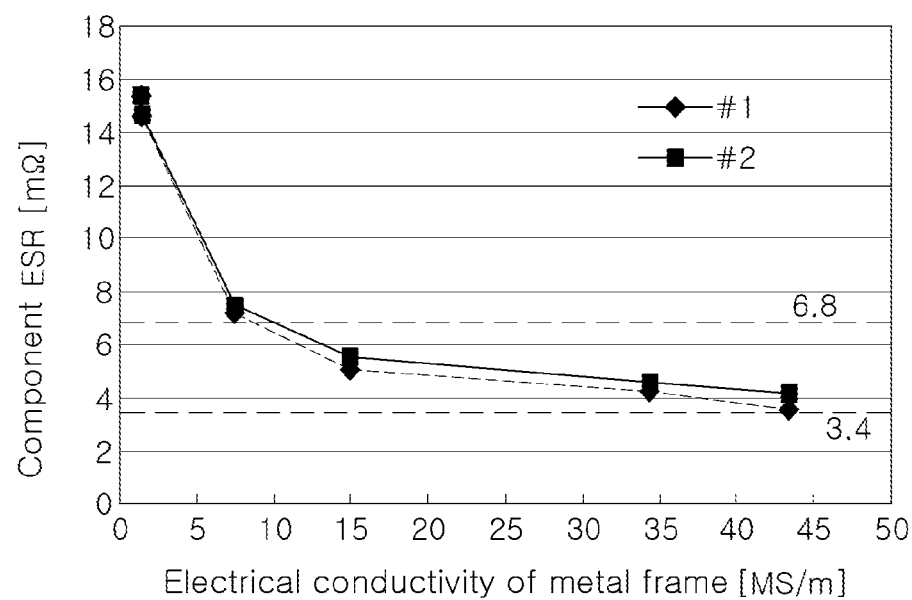
FIG. 6 is a graph illustrating ESR of an electronic component according to electrical conductivity of a metal frame.

FIG. 6 is a graph illustrating ESR of an electronic component according to the electrical conductivity of the metal frame when the electronic component of this embodiment is mounted on a substrate.

In this case, the multilayer capacitor has a length×width of 3.2 mm×2.5 mm, a distance from a mounting portion of the metal frame to a band portion of the external electrode is 1.0 mm±0.2 mm, the length×width of the mounting portion is 0.8 mm×2.5 mm, and the length×width of the electrode pad is 1.4 mm×2.9 mm.

In this case, #1 is formed of one material in which the entire metal frame has the same electrical conductivity, and #2 has a metal frame structure in which an F2 region is formed to have low electrical conductivity (1.39 MS/m), and an F1 region has different electrical conductivity. ESR of the electronic component was respectively evaluated when the structures of the metal frames as above are applied, and the results are illustrated in FIG. 6.

In this case, each electronic component is mounted on the board with SAC305 solder. In addition, the electrical conductivity of SAC305 solder is about 7.7 ms/m, and the ESR of the multilayer capacitor before bonding the metal frame is 3.4 mΩ.

In Table 1 below, the electrical conductivity corresponding to ⓐ-ⓕ is the electrical conductivity of F1 of #2, and is an x-axis value of FIG. 6. In the case of #1, the entire metal frame is formed of the same electrical conductivity.

TABLE 1

| No. | ⓐ | ⓑ | ⓒ | ⓓ | ⓔ | ⓕ |
|---|---|---|---|---|---|---|
| Electrical conductivity of metal frame [MS/m] | 1.39 | 1.45 | 7.5 | 15 | 34.4 | 43.5 |
| ESR of #1 | 15.4 | 14.7 | 7.2 | 5.1 | 4.2 | 3.6 |
| ESR of #2 | 15.4 | 14.7 | 7.4 | 5.5 | 4.5 | 4.1 |

Referring to Table 1 and FIG. 6, it can be seen that as the electrical conductivity of the metal frame increases, the ESR of the electronic component to which the metal frame is bonded decreases.

In addition, compared to #1 in which the entire metal frame has the same conductivity, the ESR change trend is similar to that of #1 even in the case of #2, in which only the F1 region has relatively high electrical conductivity and the F2 region has low electrical conductivity.

In detail, the higher the electrical conductivity of the metal frame is, the more effective it is to improve ESR. In detail, it can be seen that, even when the electrical conductivity is selectively high only in the area not bonded to solder, an improvement effect similar to that of the case in which the electrical conductivity of the entire metal frame is high may be obtained.

In general, since it is problematic when the heat generated by ESR in a multilayer capacitor is twice or more the room temperature, the ESR exceeding twice the reference may be regarded as an abnormal value.

According to the above results, regardless of the structures of #1 and #2, when the electrical conductivity of the metal frame is lower than 7.7 MS/m that is the electrical conductivity of solder, the ESR exceeds twice.

The higher the electrical conductivity of the conductive path is, the lower the ESR of the electronic component is. In this embodiment, since solder and the metal frame are bonded in the region of F2, when the electrical conductivity of the metal frame is lower than that of the solder, the ESR is determined according to the electrical conductivity of the solder.

On the other hand, in the region of F1, the ESR of the electronic component is determined depending on only the electrical conductivity of the metal frame.

Accordingly, to suppress an increase in ESR in an electronic component having a metal frame, at least the electrical conductivity of the portion F1 not in contact with the solder in the metal frame should be higher than that of the solder.

As described above, according to this embodiment, in the multilayer capacitor to which the metal frame is bonded, the increase in ESR of the component due to the bonding of the metal frame may be significantly reduced by enabling the electrical conductivity of a partial region of the metal frame to be higher than that of the solder, and further, manufacturing costs may be reduced, compared to the case in which the entirety of the metal frame is configured to have high conductivity.

As set forth above, according to an embodiment, by applying a metal frame structure, durability of a multilayer capacitor against vibrations and deformation may be increased, and the metal frame is divided into first and second portions formed of different metals having different electrical conductivity, thereby providing an effect of significantly reducing an increase in equivalent series resistance caused by a metal frame.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic component which is mounted on a substrate having an electrode pad disposed on an upper surface thereof and bonded to a metal frame of the electronic component through a solder, the electronic component comprising:
    a capacitor body;
    an external electrode respectively disposed on one end of the capacitor body; and
    a metal frame connected to the external electrode and mounted on the electrode pad of the substrate,
    wherein the metal frame comprises first and second portions having respective outer surfaces which include different metals having different electrical conductivity.

2. The electronic component of claim 1, wherein the first portion includes at least one of Ni, Fe or Sn, and the second portion includes at least one of Cu, Al, Ag or Au.

3. The electronic component of claim 2, wherein the first portion is in contact with the solder, and the second portion is not in contact with the solder.

4. The electronic component of claim 3, wherein the electrical conductivity of the first portion is less than or equal to electrical conductivity of the solder.

5. The electronic component of claim 1, wherein the capacitor body includes a dielectric layer and a plurality of internal electrodes alternately disposed with the dielectric layer interposed therebetween.

6. The electronic component of claim 1, wherein the external electrode includes:
    a head portion disposed on one surface of the capacitor body; and
    a band portion extending from the head portion onto portions of upper and lower surfaces and both side surfaces of the capacitor body that are connected to the one surface of the capacitor body.

7. The electronic component of claim 6, wherein the metal frame includes:
    a connection portion connected to the head portion; and
    a mounting portion bent from a lower end of the connection portion and extending to be connected to the electrode pad.

8. The electronic component of claim 7, wherein a conductive bonding layer is disposed between the head portion of the external electrode and the connection portion of the metal frame.

9. The electronic component of claim 7, wherein the mounting portion extends in a direction from the lower end of the connection portion toward a mounting portion of another metal frame located opposite thereto.

10. The electronic component of claim 7, wherein the mounting portion and the band portion of the external electrode are spaced apart from each other.

11. The electronic component of claim 7, wherein a length of a vertical portion of the metal frame, not in contact with the solder, is greater than a length of the head portion of the external electrode, with respect to a direction in which the electronic component is mounted on the substrate.

12. An electronic component which is mounted on a substrate having an electrode pad disposed on an upper surface thereof and bonded to a metal frame of the electronic component through a solder, the electronic component comprising:
    a capacitor body;
    an external electrode respectively disposed on one end of the capacitor body; and
    a metal frame connected to the external electrode and mounted on the electrode pad of the substrate,
    wherein the metal frame comprises a first portion, which is in contact with the solder, and a second portion, which is not in contact with the solder, and
    electrical conductivity of an entire homogenous thickness of the second portion is higher than electrical conductivity of the solder.

13. The electronic component of claim 12, wherein the first and second portions of the metal frame include different metals having different electrical conductivity.

14. The electronic component of claim 13, wherein the first portion includes at least one of Ni, Fe or Sn, and the second portion includes at least one of Cu, Al, Ag or Au.

15. The electronic component of claim 12, wherein electrical conductivity of the first portion is less than or equal to the electrical conductivity of the solder.

16. The electronic component of claim 12, wherein the external electrode includes:
    a head portion disposed on one surface of the capacitor body; and
    a band portion extending from the head portion onto portions of upper and lower surfaces and both side surfaces of the capacitor body that are connected to the one surface of the capacitor body.

17. The electronic component of claim 16, wherein the metal frame includes:
    a connection portion connected to the head portion; and
    a mounting portion bent from a lower end of the connection portion and extending to be connected to the electrode pad.

18. The electronic component of claim 17, wherein the mounting portion extends in a direction from the lower end of the connection portion toward a mounting portion of another metal frame located opposite thereto.

19. The electronic component of claim 17, wherein the mounting portion and the band portion of the external electrode are spaced apart from each other.

20. The electronic component of claim 17, wherein a length of a vertical portion of the metal frame, not in contact with the solder, is greater than a length of the head portion of the external electrode, with respect to a direction in which the electronic component is mounted on the substrate.

* * * * *